(12) United States Patent
Hill

(10) Patent No.: US 10,119,732 B1
(45) Date of Patent: *Nov. 6, 2018

(54) ENERGY ATTACHMENT FOR A HELMET

(71) Applicant: Christian G. Hill, Erie, CO (US)

(72) Inventor: Christian G. Hill, Erie, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,865

(22) Filed: Apr. 24, 2017

Related U.S. Application Data

(62) Division of application No. 14/824,992, filed on Aug. 12, 2015, now Pat. No. 9,651,280.

(51) Int. Cl.
| | |
|---|---|
| *H02J 7/00* | (2006.01) |
| *F25B 21/04* | (2006.01) |
| *A42B 3/28* | (2006.01) |
| *H02J 7/35* | (2006.01) |
| *A42B 3/04* | (2006.01) |
| *H05B 33/08* | (2006.01) |
| *F25B 27/00* | (2006.01) |

(52) U.S. Cl.
CPC ........... *F25B 21/04* (2013.01); *A42B 3/044* (2013.01); *A42B 3/285* (2013.01); *H02J 7/35* (2013.01); *H05B 33/0815* (2013.01); *F25B 27/002* (2013.01); *H02J 7/0031* (2013.01); *H02J 7/0054* (2013.01); *H02J 7/0055* (2013.01); *H02J 7/0068* (2013.01); *H02J 7/355* (2013.01); *H02J 2007/004* (2013.01); *H02J 2007/0062* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 3,548,415 A | * | 12/1970 | Waters ................... | A42B 3/286 |
| | | | | 165/46 |
| 7,586,292 B1 | * | 9/2009 | Wakefield ................ | H02H 7/18 |
| | | | | 320/136 |
| 8,783,892 B2 | | 7/2014 | Liao | |
| 9,241,529 B1 | * | 1/2016 | Danelski ................ | A42B 3/286 |
| 2004/0052068 A1 | | 3/2004 | Chien et al. | |
| 2004/0169419 A1 | * | 9/2004 | Wagner ................. | H02J 7/0031 |
| | | | | 307/9.1 |
| 2007/0080692 A1 | * | 4/2007 | Evans ................ | G01R 31/3679 |
| | | | | 324/426 |
| 2009/0089917 A1 | * | 4/2009 | Chen .................... | A42B 3/0406 |
| | | | | 2/422 |
| 2009/0180278 A1 | | 7/2009 | Cheng et al. | |
| 2010/0277895 A1 | * | 11/2010 | Huang ................... | A42B 3/044 |
| | | | | 362/105 |

(Continued)

*Primary Examiner* — Samuel Berhanu
(74) *Attorney, Agent, or Firm* — Shifrin Patent Law; Dan Shifrin

(57) ABSTRACT

A helmet attachment is provided, comprising: a shell having a concave bottom; a base having: a convex top affixed to the concave bottom of the shell; a concave bottom affixable to the convex top of a helmet; and an air flow channel formed in the convex top of the base for guiding air through to an exit in the concave bottom of the base; a power and electronics module secured within a cavity in the shell, comprising: a power source; and a 5 volt power output connector electrically coupled to the power source and configured for charging a small electronic device; and a heater electrically coupled to the power source.

8 Claims, 19 Drawing Sheets

(56) References Cited

U.S. PATENT DOCUMENTS

2012/0112684 A1\* 5/2012 Xu ................. B60L 3/0046
                                                                                                       320/101

2013/0033852 A1\* 2/2013 Liao ................. A42B 1/24
                                                                                                       362/106

\* cited by examiner

ENERGY ATTACHMENT FOR A HELMET

RELATED APPLICATION DATA

The present application is a divisional application of commonly-owned and co-pending U.S. application Ser. No. 14/824,992 entitled ENERGY ATTACHMENT FOR A HELMET, filed on Aug. 12, 2015, which application is incorporated herein by reference in its entirety. The present application is also related to commonly-owned and co-pending U.S. application Ser. No. 15/495,872, entitled ENERGY ATTACHMENT FOR A HELMET, filed on Apr. 24, 2017, which application is a divisional application of the aforementioned U.S. application Ser. No. 14/824,992 and is incorporated herein by reference in its entirety. The present application is also related to and is a continuation-in-part of commonly owned and co-pending U.S. application Ser. No. 29/499,886 entitled ENERGY ATTACHMENT FOR A HELMET, filed on Aug. 19, 2014, which application is incorporated herein by reference in its entirety.

TECHNICAL FIELD

The present invention relates generally to helmet accessories and, in particular, to a helmet attachment that provides power, lighting and heating or cooling to the wearer.

BACKGROUND ART

Helmets have been in common use for some time protecting user's heads in such outdoor activities as skiing, bicycling, motorcycle riding, and climbing, among other activities. Defense against the elements includes the use of layered clothing, boots, gloves, and hats, among other articles. Well equipped outdoorsmen and women may also carry one or more of a flashlight, cell phone, GPS device, avalanche beacon, and chemical hand warmers, among other items.

However, while a hiker on an urban trail may remain within strong cell phone coverage, many mountain and other remote areas may have spotty coverage, or none at all, leading to a higher rate of discharge of a phone's battery trying to connect with cell service. Additionally, it is also well known that the life of most batteries is substantially reduced as the temperature becomes colder. And, even in temperate conditions, batteries have only a limited life before they are rendered useless.

On top of that, changing conditions, such as falling temperature, increasing wind, precipitation, whiteout, darkness, and injury may be dangerous to novice athletes and even the most well prepared outdoorsman or woman, and can lead to hypothermia, frostbite, or other complications. It will be appreciated that these are the very conditions that may cause battery powered electric and electronic devices to fail due to loss of power, just when they may be needed most.

SUMMARY OF THE INVENTION

The present invention provides a helmet attachment, comprising: a shell having a concave bottom, a base, a power and electronics module secured within a cavity in the shell, and a heater electrically coupled to the power source. The base has a convex top affixed to the concave bottom of the shell, a concave bottom affixable to the convex top of a helmet, and an air flow channel formed in the convex top of the base for guiding air entering from an entrance in a front of the base through to an exit in the concave bottom of the base. The power and electronics module comprises: a power source and a 5 volt power output connector electrically coupled to the power source and configured for charging a small electronic device. The power source comprises a solar array secured to a top of the shell, a battery pack secured within the cavity in the shell, and a charging module secured within the cavity in the shell and configured to charge the battery pack from current provided by the solar array. The present invention also provides the attachment integrated into a helmet.

The present invention also provides a power and electronics module secured to a helmet attachment, comprising a power source, a 5 volt power output connector electrically coupled to the power source and configured for charging a small electronic device, and a heater electrically coupled to the power source. The power source comprises a solar array secured to a top of the helmet attachment, a battery pack secured within a cavity in the helmet attachment, and a charging module secured within the cavity in the helmet attachment and configured to charge the battery pack from current provided by the solar array.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 17A:
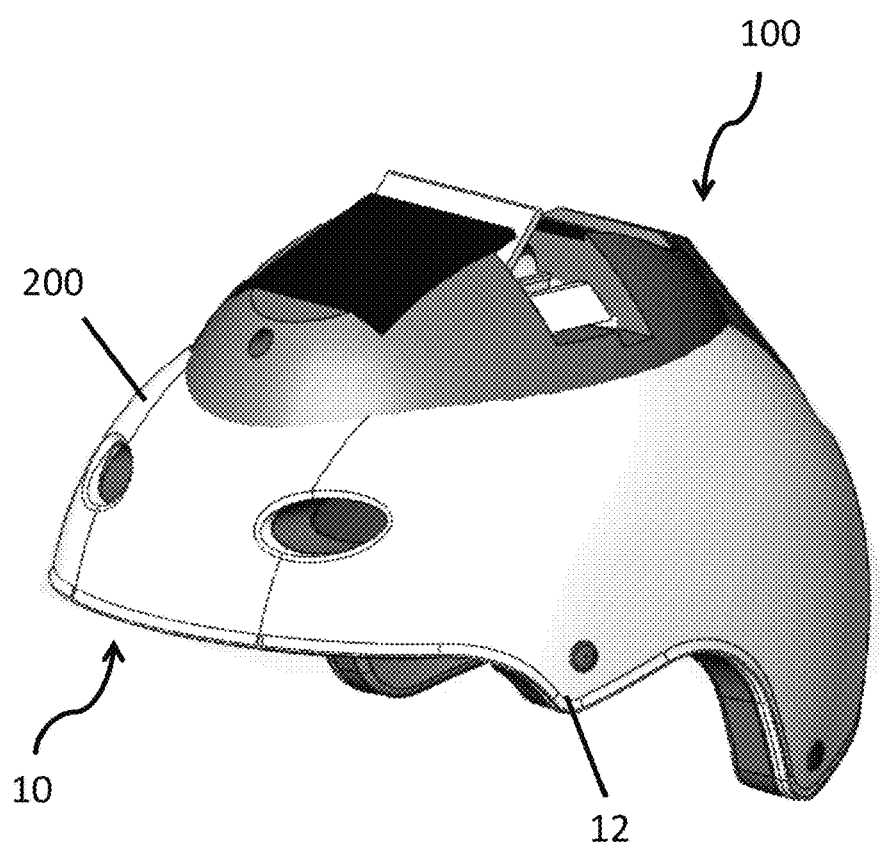
FIG. 17A illustrates a front perspective view of the energy attachment of FIG. 1 secured to a helmet.
Figure 17B:
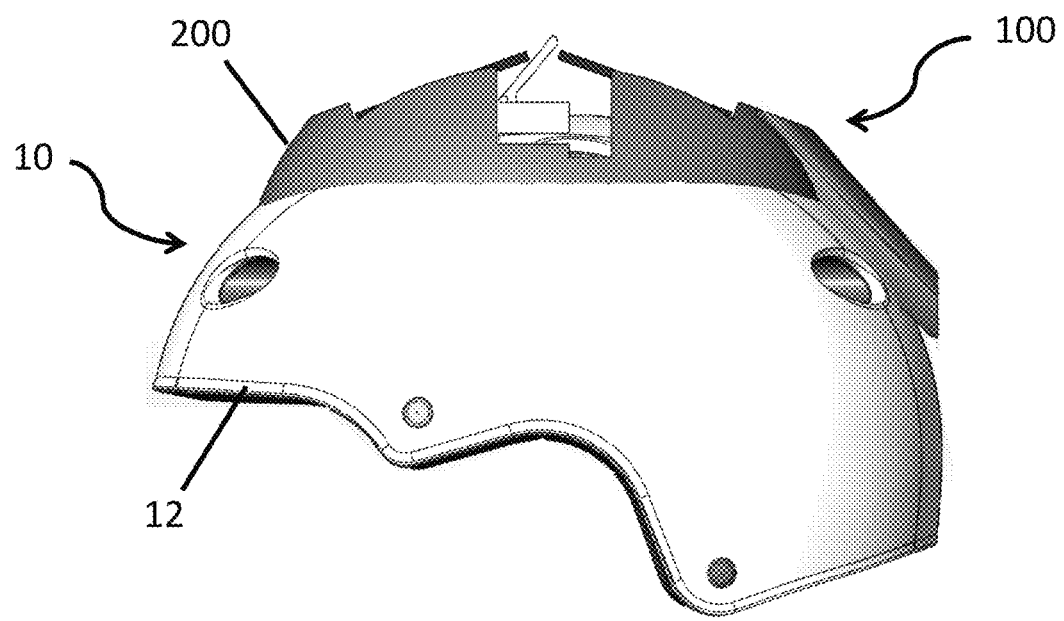
FIG. 17B illustrates a side view of the helmet and energy attachment combination of FIG. 17A.

Embodiments of the present invention provide a helmet attachment 100 that is secured to the top of an ordinary helmet. As illustrated in the front and rear perspective views of FIGS. 1-2, the attachment 100 includes a shell 200 that has a streamlined shape from the front 202 to the tail 204 and may be molded from a single piece of plastic. The shell 200, with a concave bottom 206, may be attached to the helmet 10 using, for example, a hook-and-loop material such as Velcro® strips without having to drill holes into the helmet and thus avoiding compromising the helmet's structural integrity. In field tests, the shell 200 has remained in place on the roof of a car in 80 mph winds and on a helmet in winds from 40 to 70 mph from different directions. FIGS. 17A and 17B illustrate front perspective and side views, respectively, of the energy attachment 100 secured to a helmet 10 with its own shell 12. The attachment 100 may also be manufactured with the helmet 10 as a single, integrated product.

As will be described in more detail below, the helmet attachment 100 also includes a weatherproof electronics and power unit 400 that is secured in a cavity or space 208 in the shell 200. The unit 400 includes one or more solar panels or an array 102, secured in recesses 210 on top of the shell 200 covering the space 208, and a battery pack 402 that may be secured within an opening 216 in the shell 200 in back of the space 208. The solar array 102 may be permanently secured to the shell 200, such as with waterproof cement. Alternatively, the solar array 102 may be affixed using, for example, a hook-and-loop material such as Velcro® strips, allowing the panels to be easily replaced if damaged.

Figure 3:
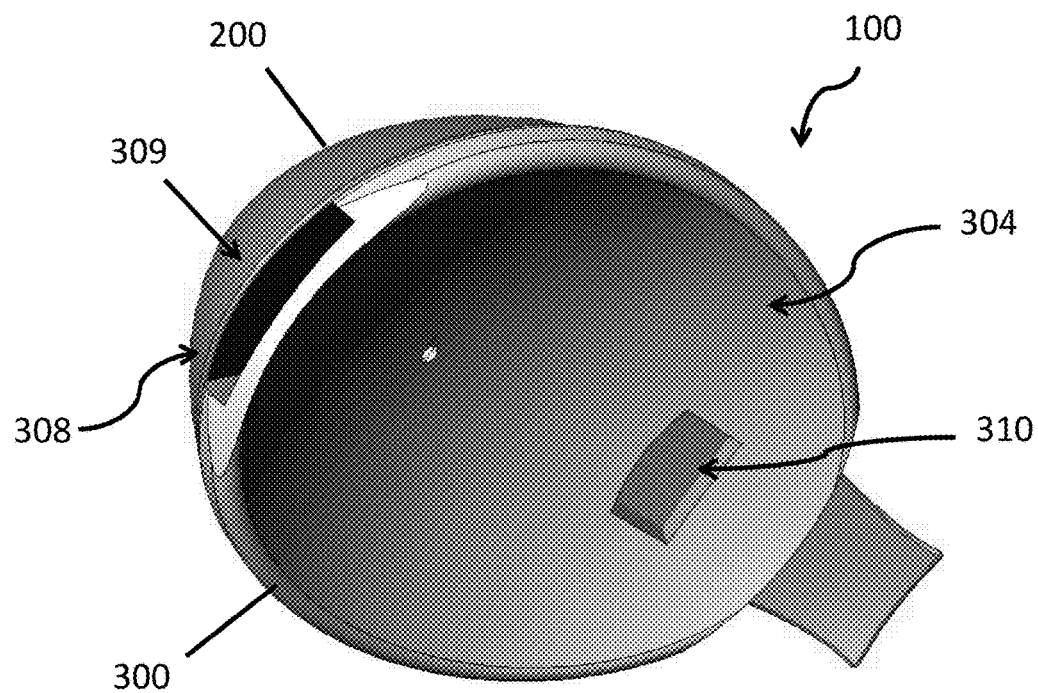
FIG. 3 is a bottom perspective view of the energy attachment of FIG. 1.
Figure 4:
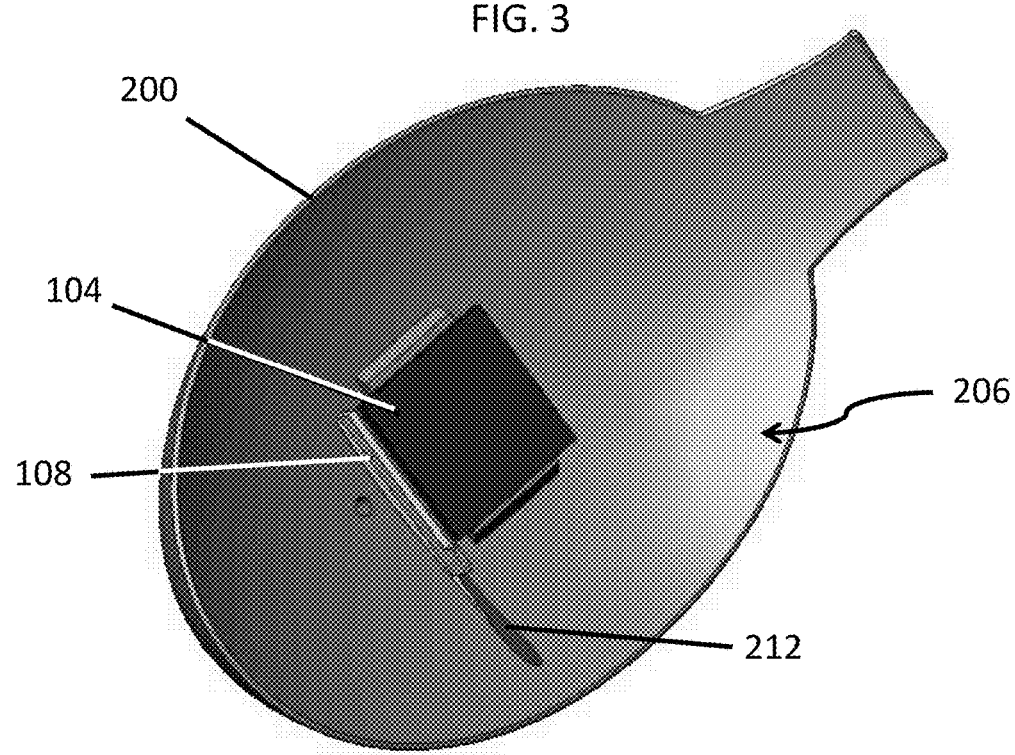
FIG. 4 is bottom perspective view of the shell of FIG. 1.

FIG. 3 is a view of the underside of the helmet attachment 100 showing the shell 200 attached to the base 300. A front-to-back channel 308 in the front of the base 300 allows for air entering an opening 309 in the base to flow between the bottom of the shell 200 and the top of the base 300. An opening 310 in the concave bottom 304 of the base 300 allows the air to exit the channel 308. As illustrated in FIG. 4, which is a view of the concave bottom 206 of the shell 200, air flowing through the channel 308 flows past a thermoelectric plate 104, which is mounted within the channel 308 to the bottom 206 of the shell 200 or the top of the base.

Figure 5:
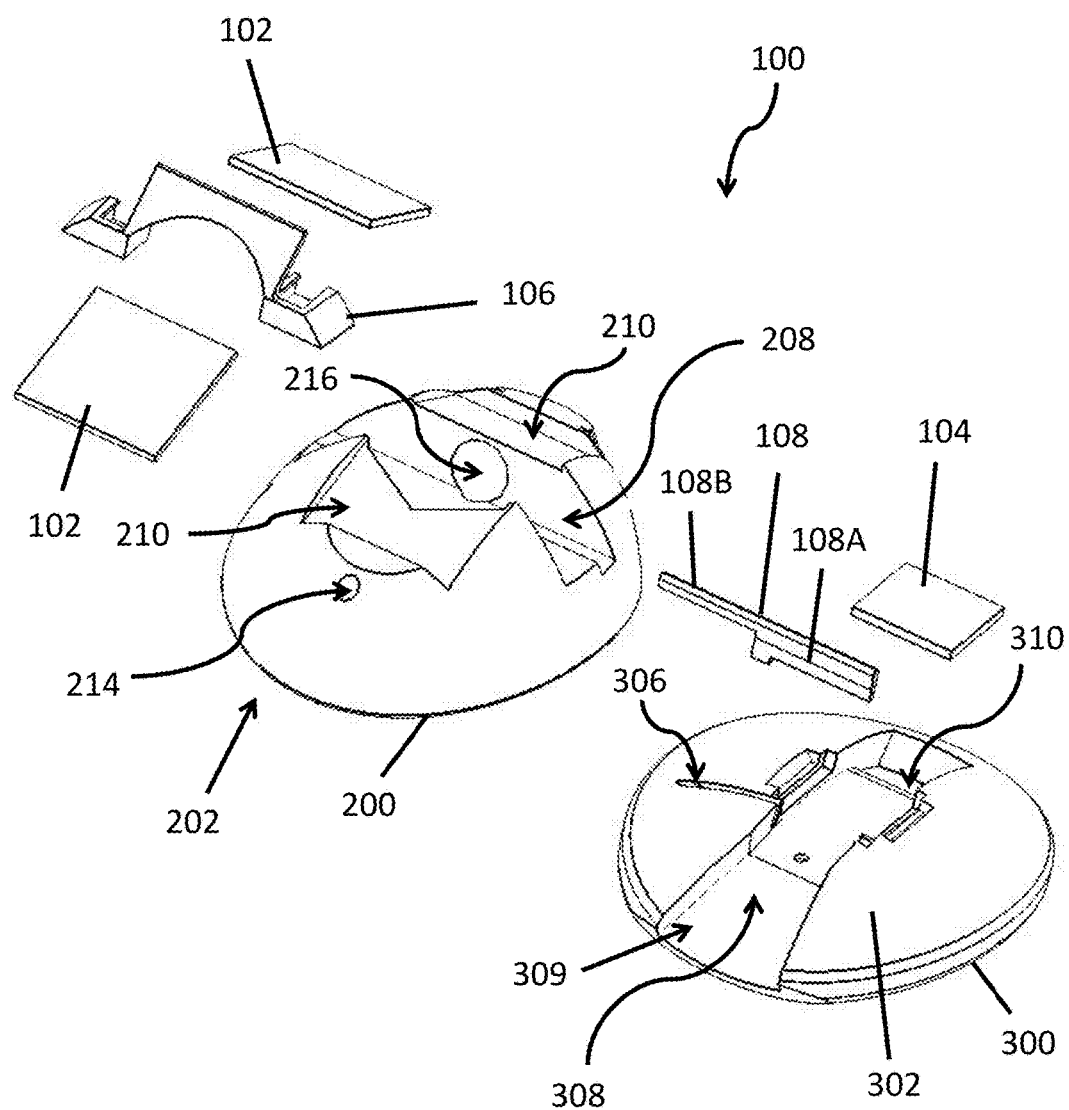
FIG. 5 is an exploded of the components of the energy attachment of FIG. 1.

FIG. 5 is an exploded view of the attachment 100. In addition to the components described above, the attachment 100 may include a holder 106 mounted in the cavity 208 and configured to secure buttons that control various features of the attachment 100.

Figure 6A:
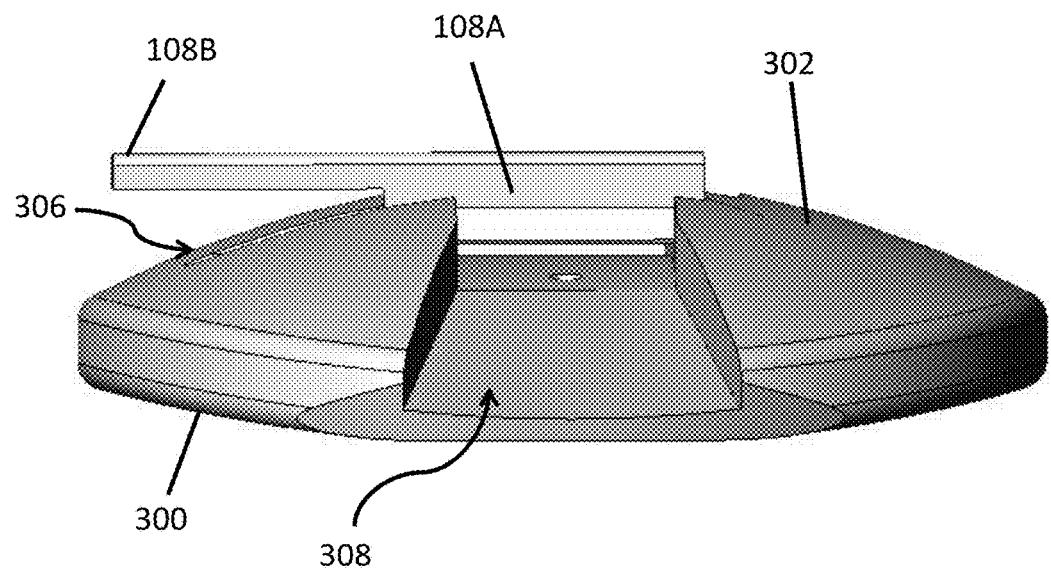
FIGS. 6A and 6B are perspective views of the base of the shell of the energy attachment of FIG. 1 with the airflow slider in the closed position and the open position, respectively.
Figure 6B:
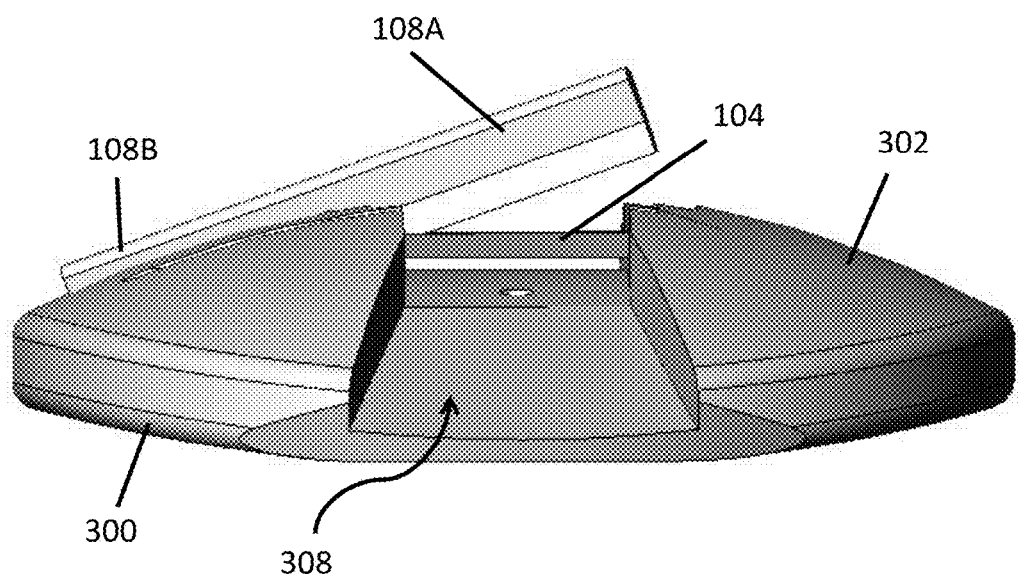
Figure 7A:
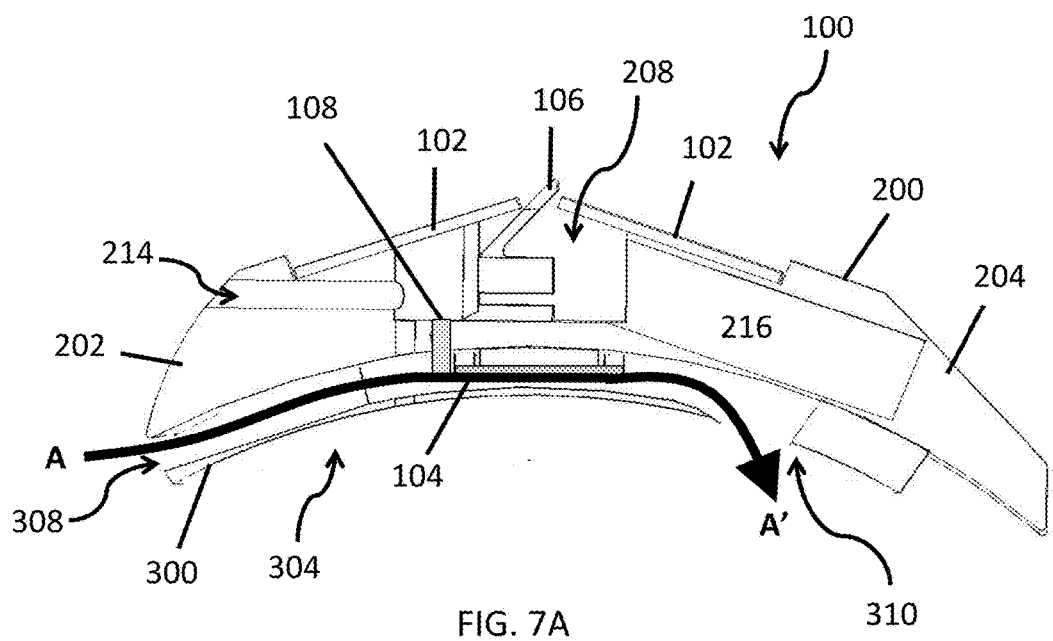
FIGS. 7A and 7B cross-sectional views of the base of the shell of the energy attachment of FIG. 1 with the airflow slider in the closed position and the open position, respectively.
Figure 7B:
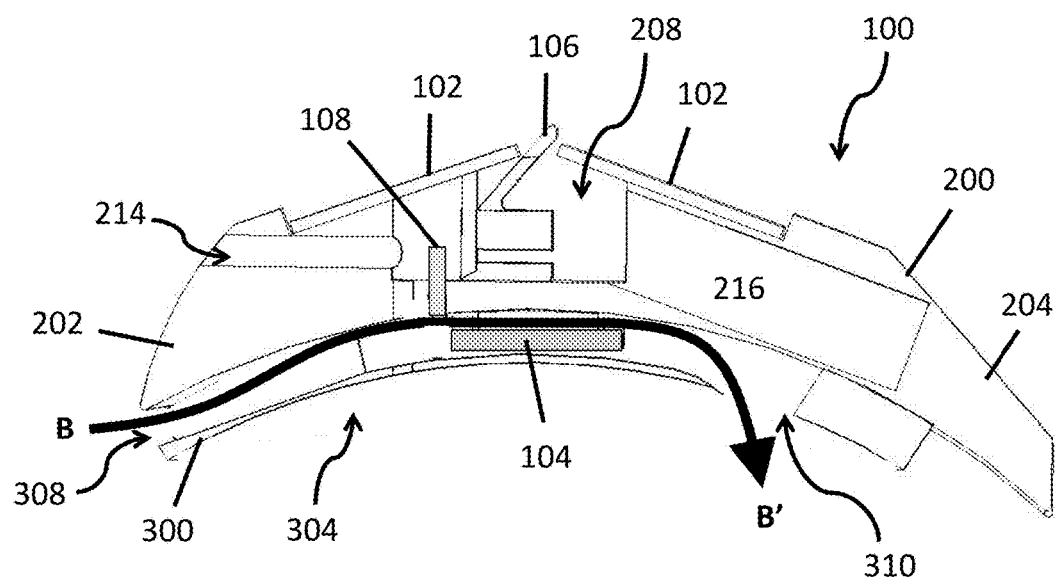

An airflow controller 108, with a blade 108A and an end tab 108B, fits in a slot 306 in the base 300 and a corresponding slot 212 in the bottom 206 of the shell 200. The airflow controller 108 may be used to direct the air that flows through the channel 308 over the bottom or top of the thermoelectric plate 104, depending on its position. FIG. 6A illustrates the airflow controller 108 in its closed position, directing air to flow across the bottom of the thermoelectric plate 104 while blocking air from flowing over the top of the thermoelectric plate 104. The arrow AA' in FIG. 7A represents the airflow when the airflow controller 108 is in this closed position. When the tab 108B is pushed down, the blade 108A is raised into its open position (FIG. 6B), allowing air to flow across the top of the thermoelectric plate 104. The arrow BB' in FIG. 7B represents the airflow when the blade 108A is in this open position. After flowing downward through the opening 310, the air flows into openings in the top of the attached helmet, providing warmed or cooled air to the wearer's head.

Figure 1:
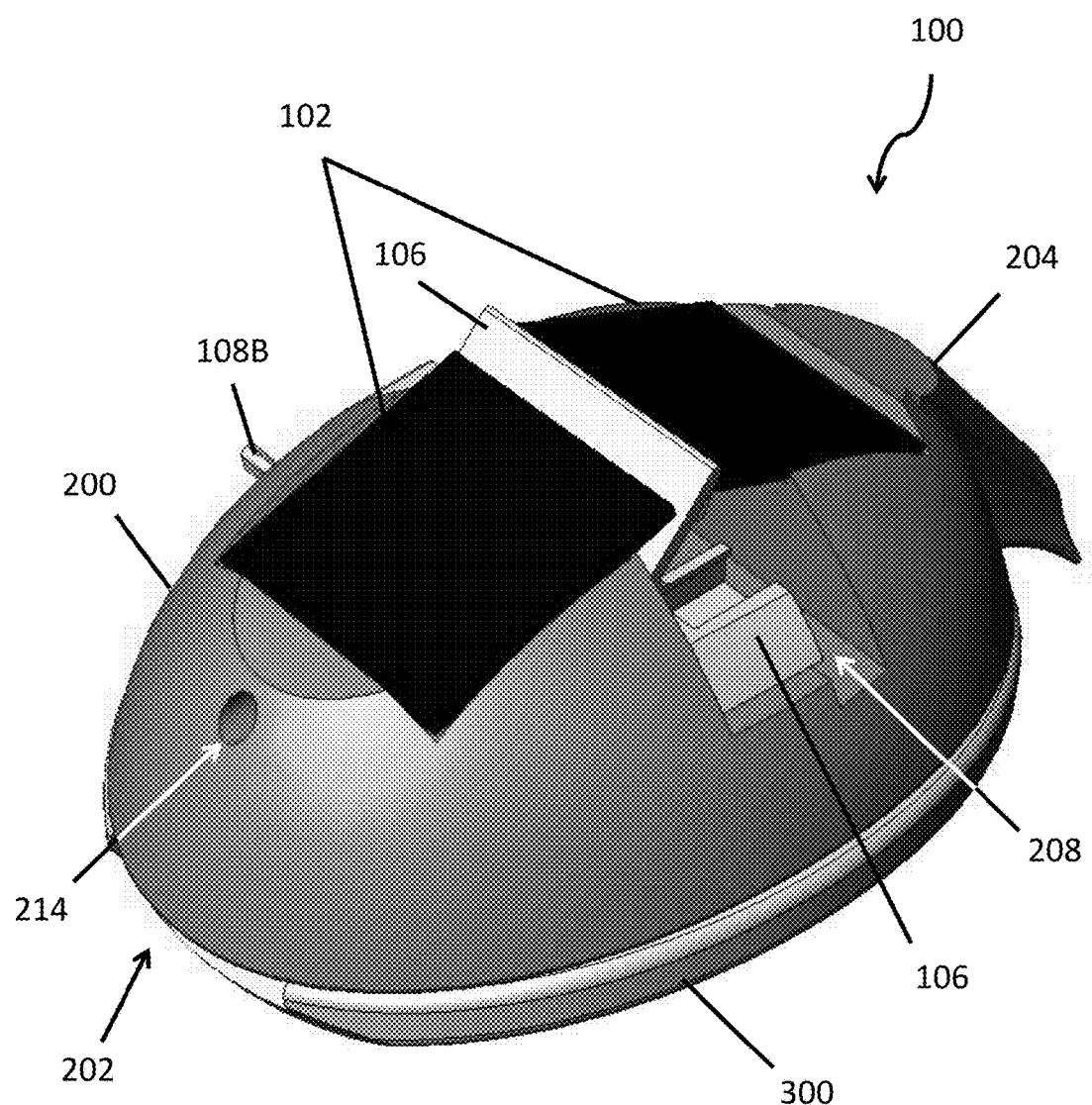
FIG. 1 is a front perspective view of an embodiment of an energy attachment for a helmet with an energy attachment of the present invention.
Figure 2:
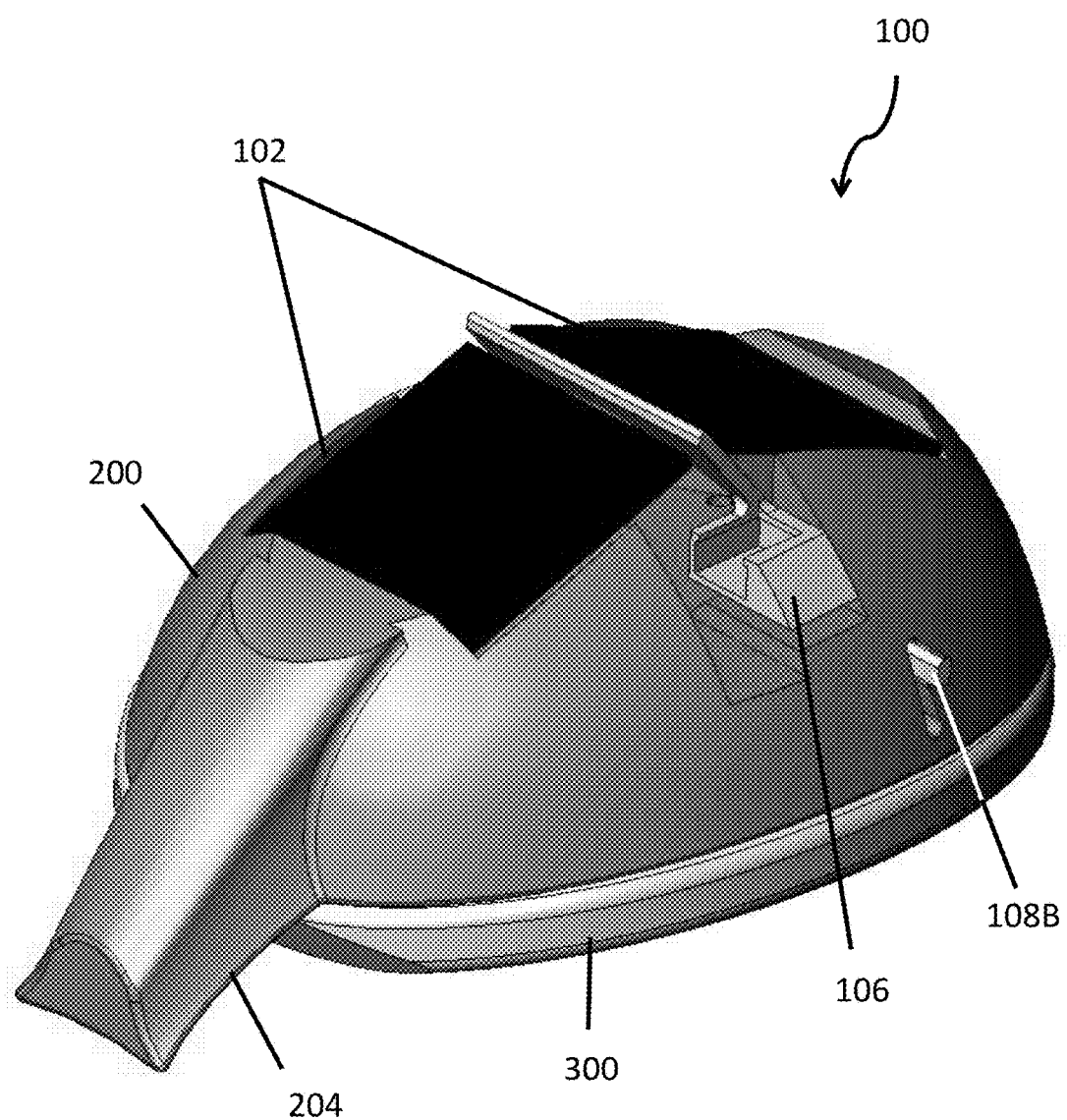
FIG. 2 is a rear perspective view of the energy attachment of FIG. 1.
Figure 8:
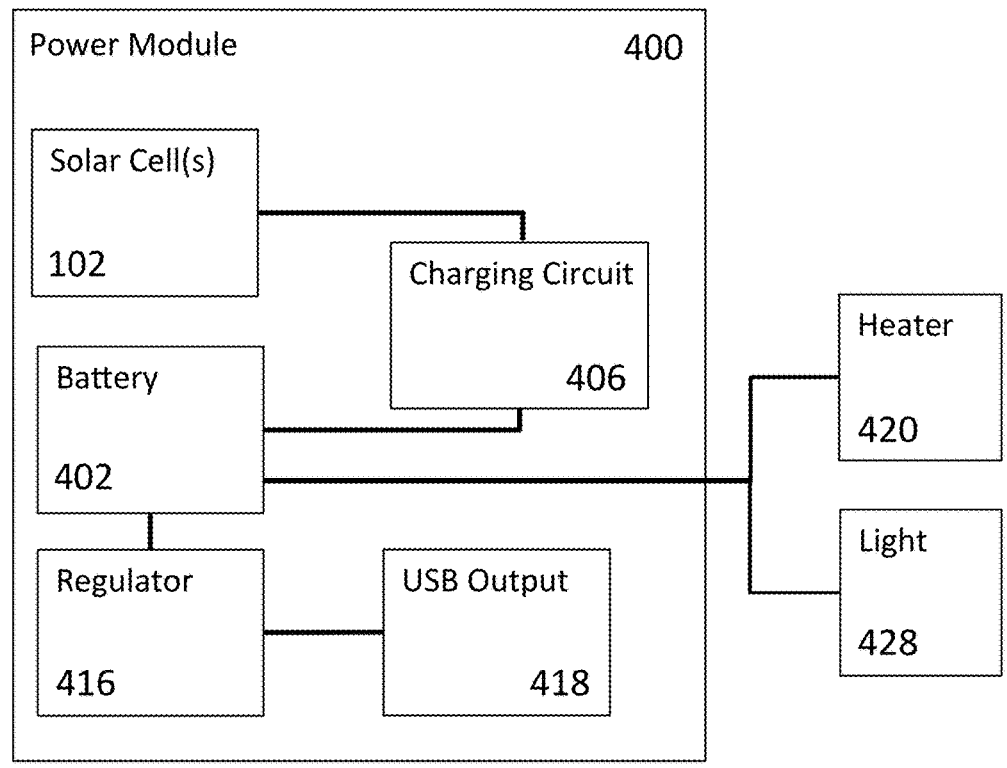
FIG. 8 is block diagram of an embodiment of the electrical components that may be used with energy attachment of FIG. 1.

FIG. 8 is block diagram of an embodiment of the electronics and power unit 400 that may be used with energy attachment of FIG. 1. In addition to the solar array 102 and battery pack 402, the unit 400 may include a charging circuit 406 coupled to charge the battery pack 402 by the solar array 102. The unit 400 may also include a power output connector 418 electrically coupled to the battery pack 402 through a regulator 416 and able to provide power or a charging current to small electronic devices, such as cell phones. A heating unit 420 and one or more LED lights 428 may also be electrically coupled to the battery pack 402 to provide heat and light to the user, as will be described below.

Figure 9:
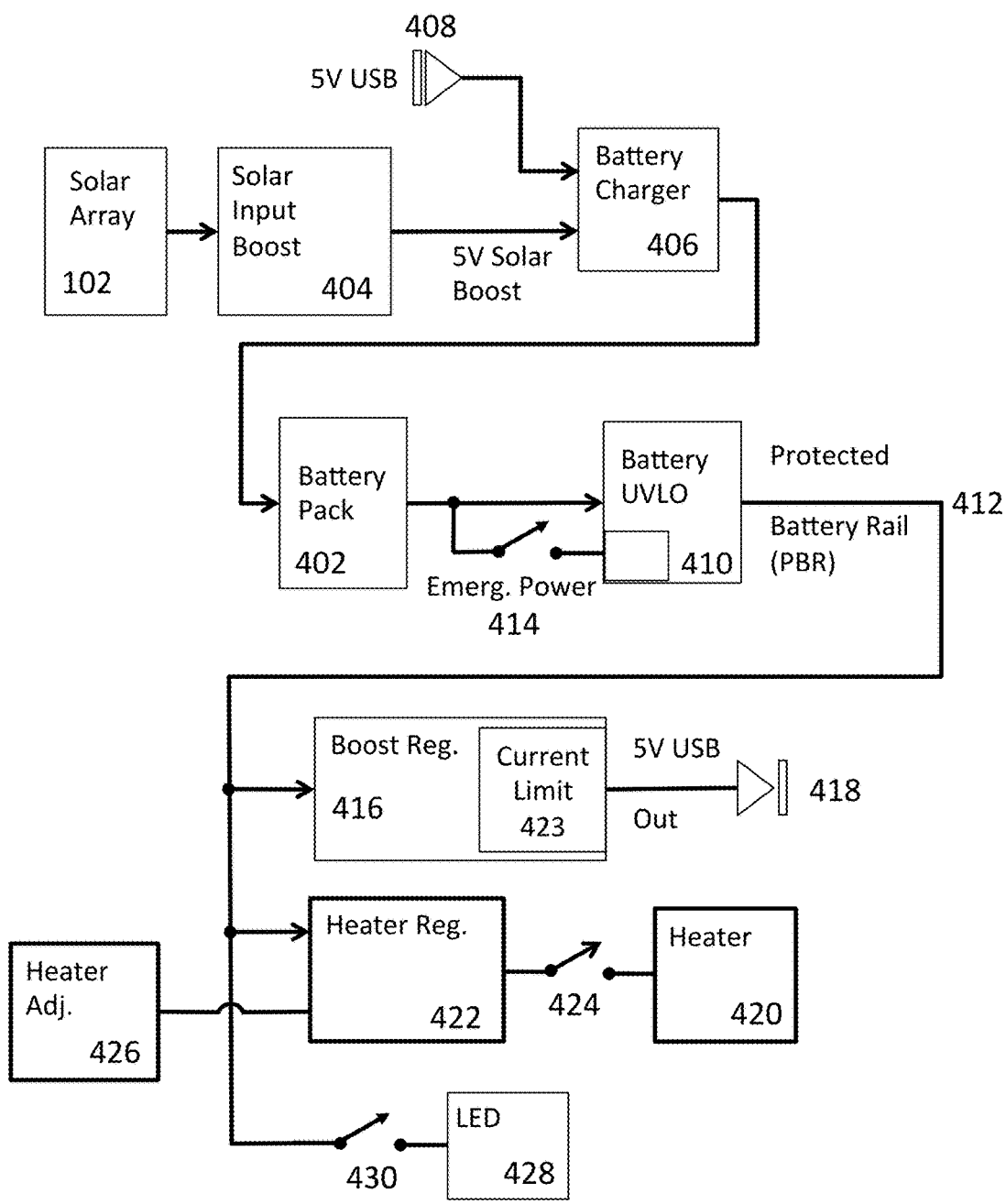
FIG. 9 illustrates a functional diagram of an embodiment of an electronics and power unit that may be used with the energy attachment of FIG. 1.
Figure 10A:
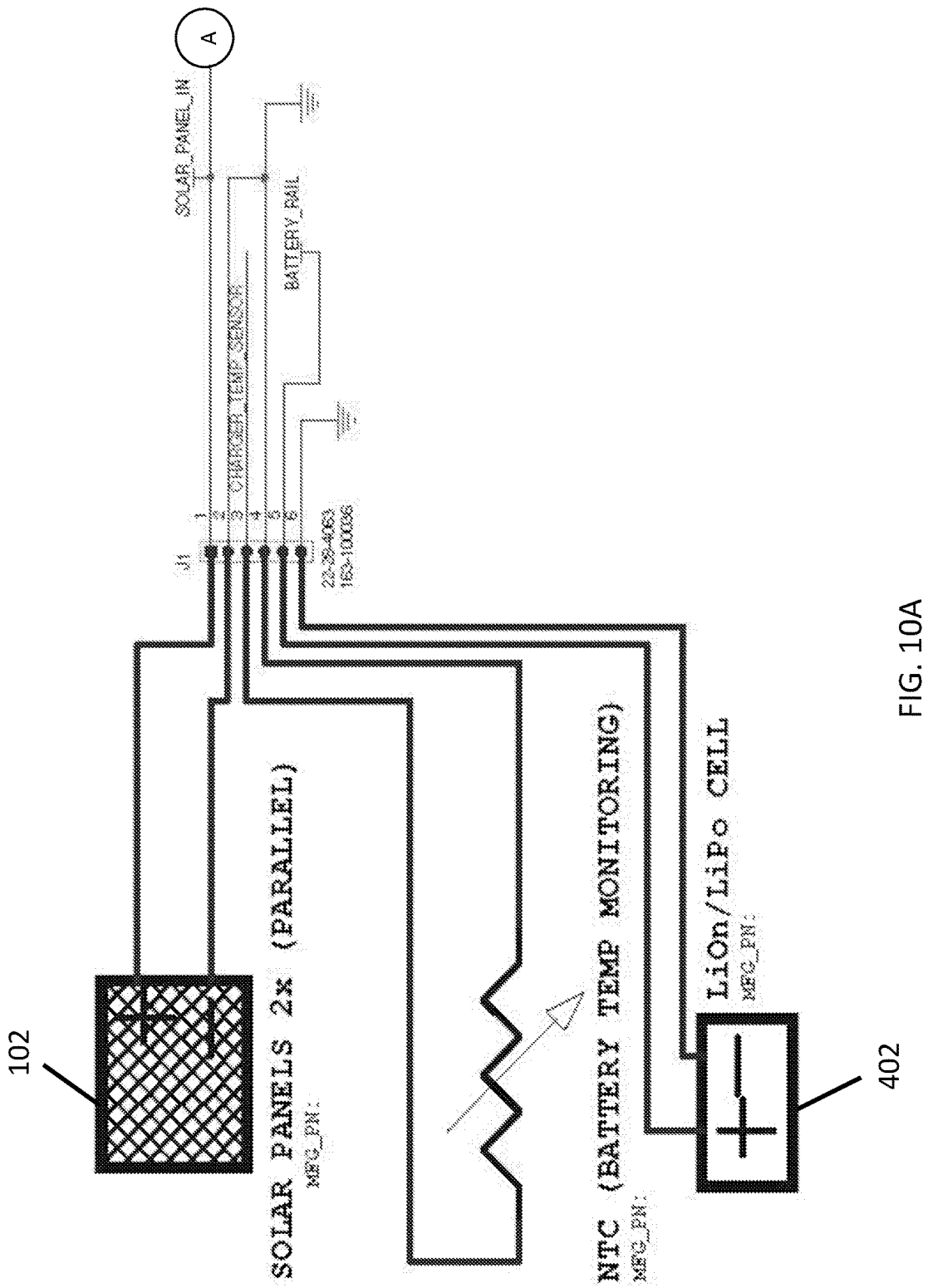
FIGS. 10A and 10B are a schematic diagram of the an embodiment of the solar panel and solar input boost circuitry of FIG. 9.
Figure 10B:
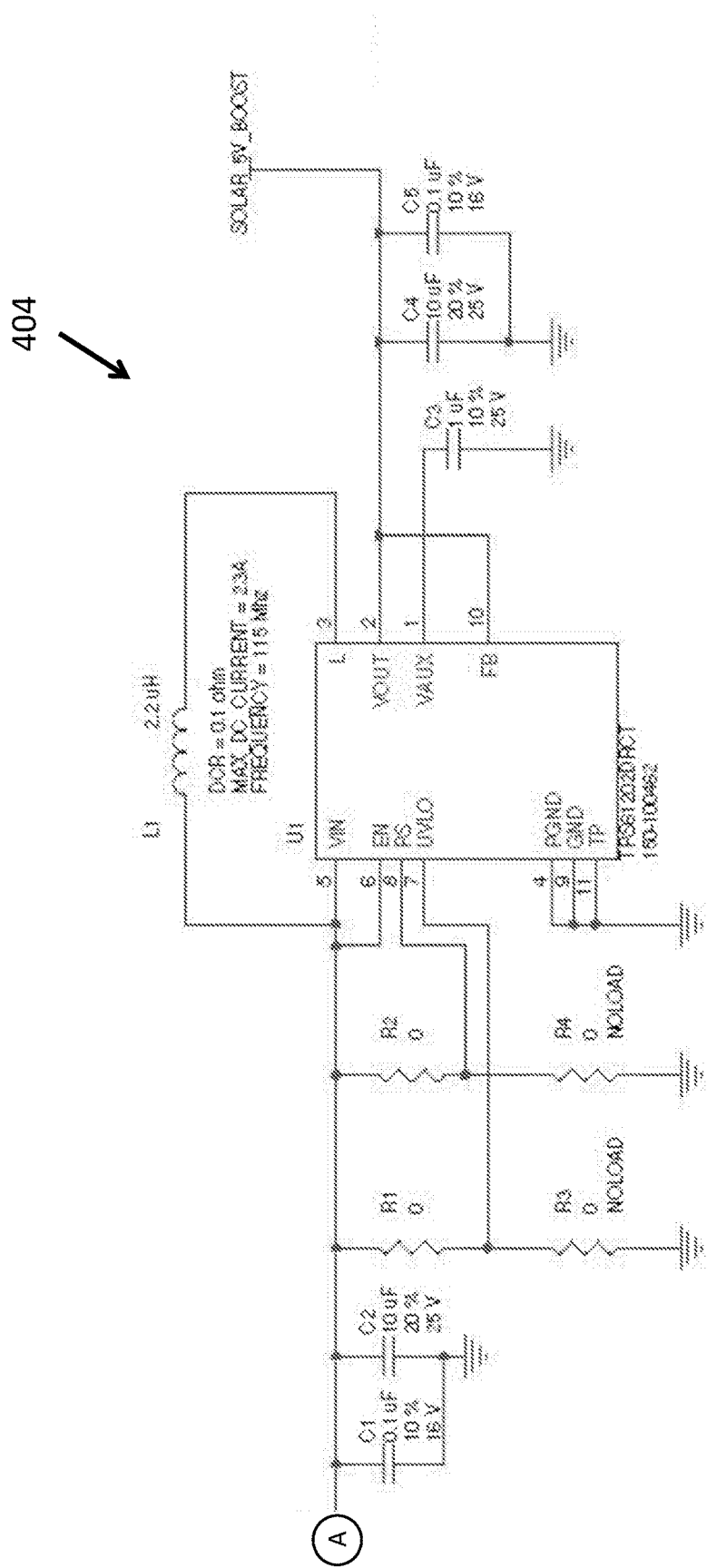
Figure 11:
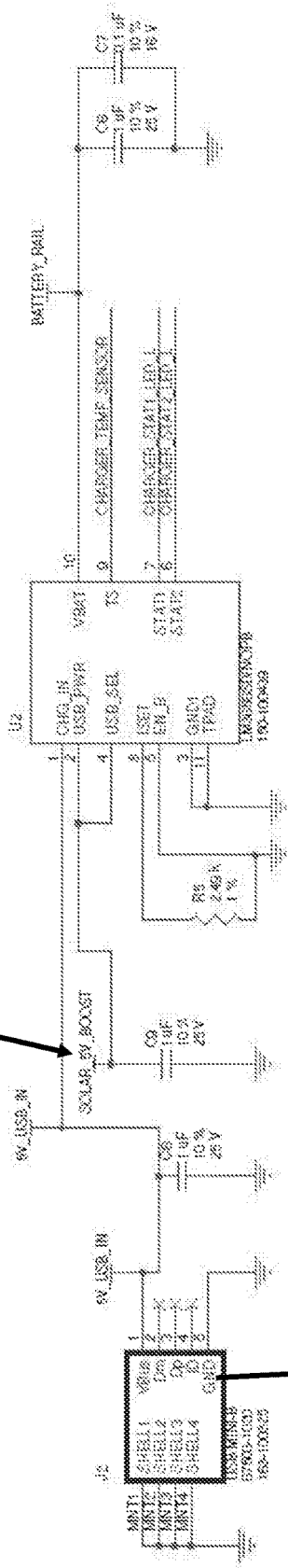
FIG. 11 is a schematic diagram of an embodiment of the battery charging circuit of FIG. 9.
Figure 12:
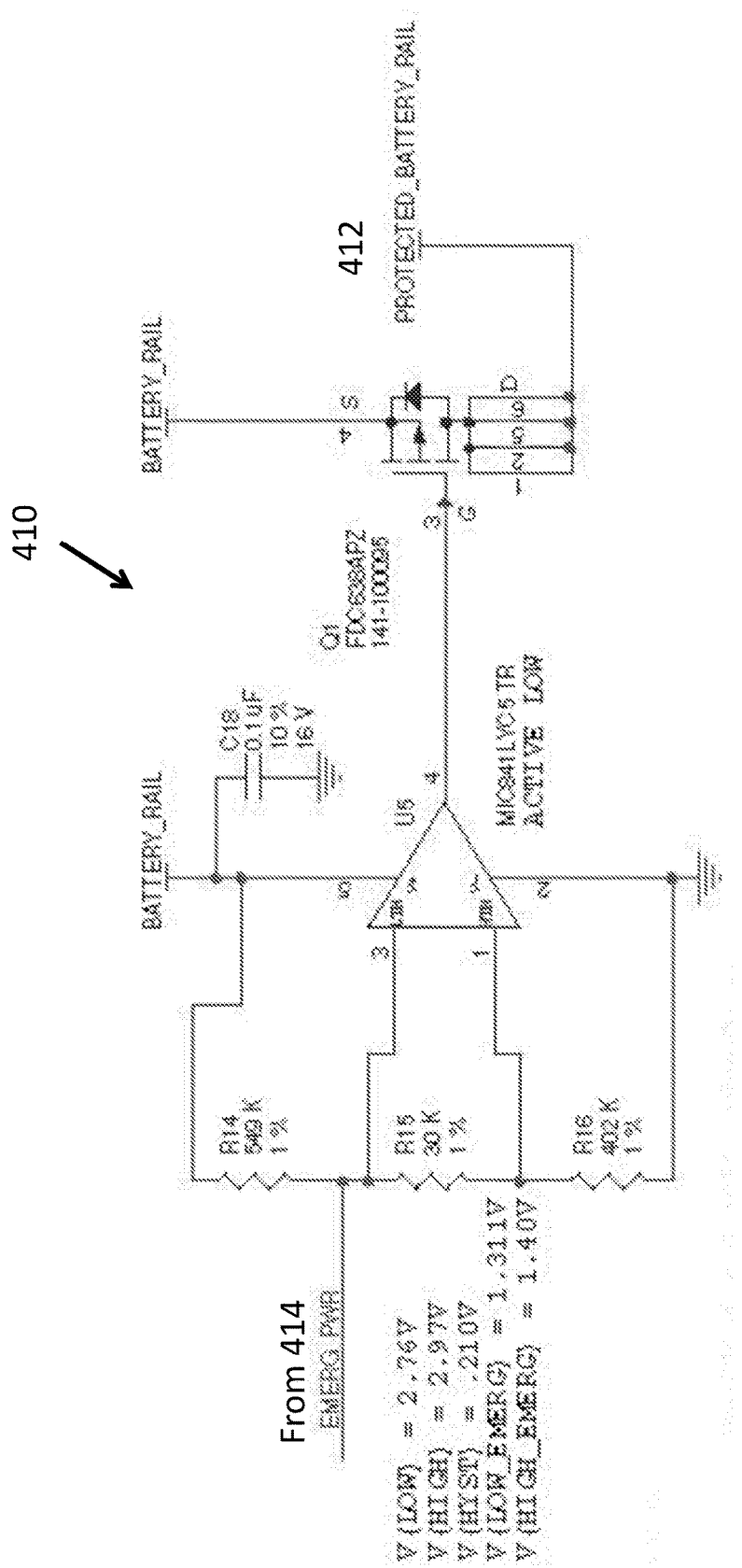
FIG. 12 is a schematic diagram of the battery undervoltage lockout circuit of FIG. 9.
Figure 13A:
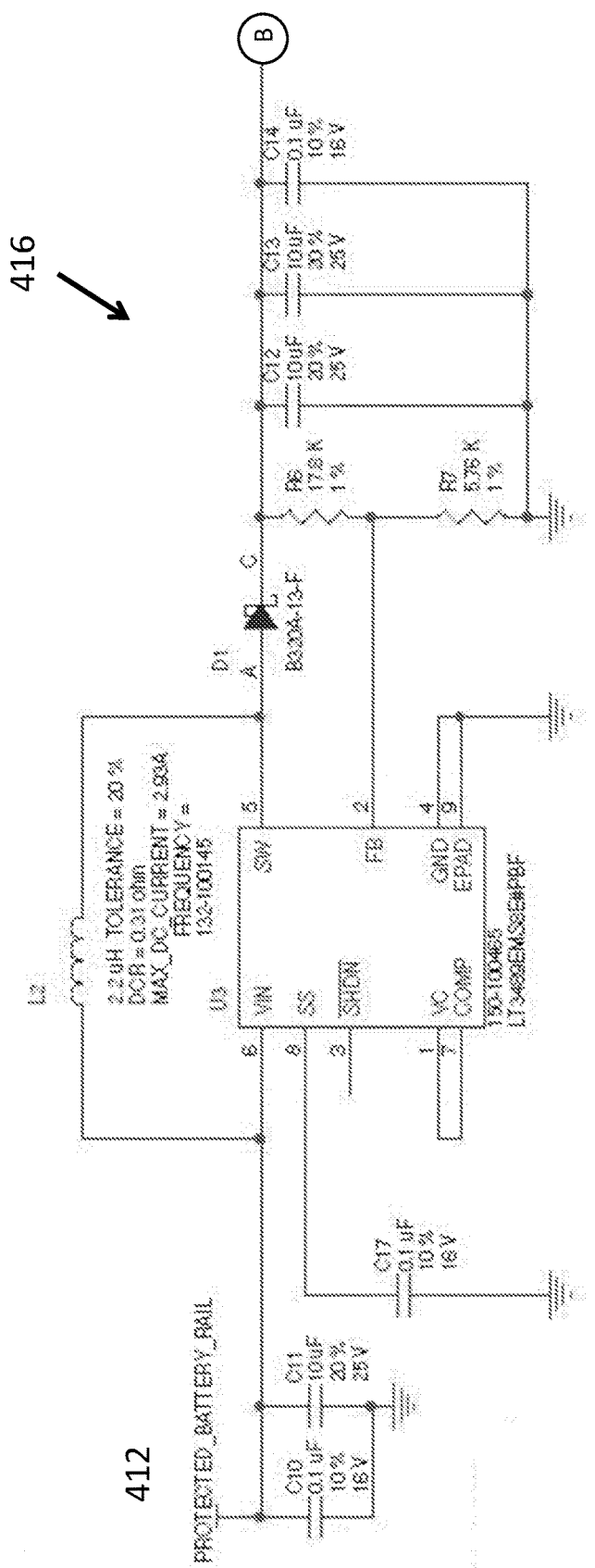
FIGS. 13A and 13B are a schematic diagram of an embodiment of the boost regulator circuit of FIG. 9.
Figure 13B:
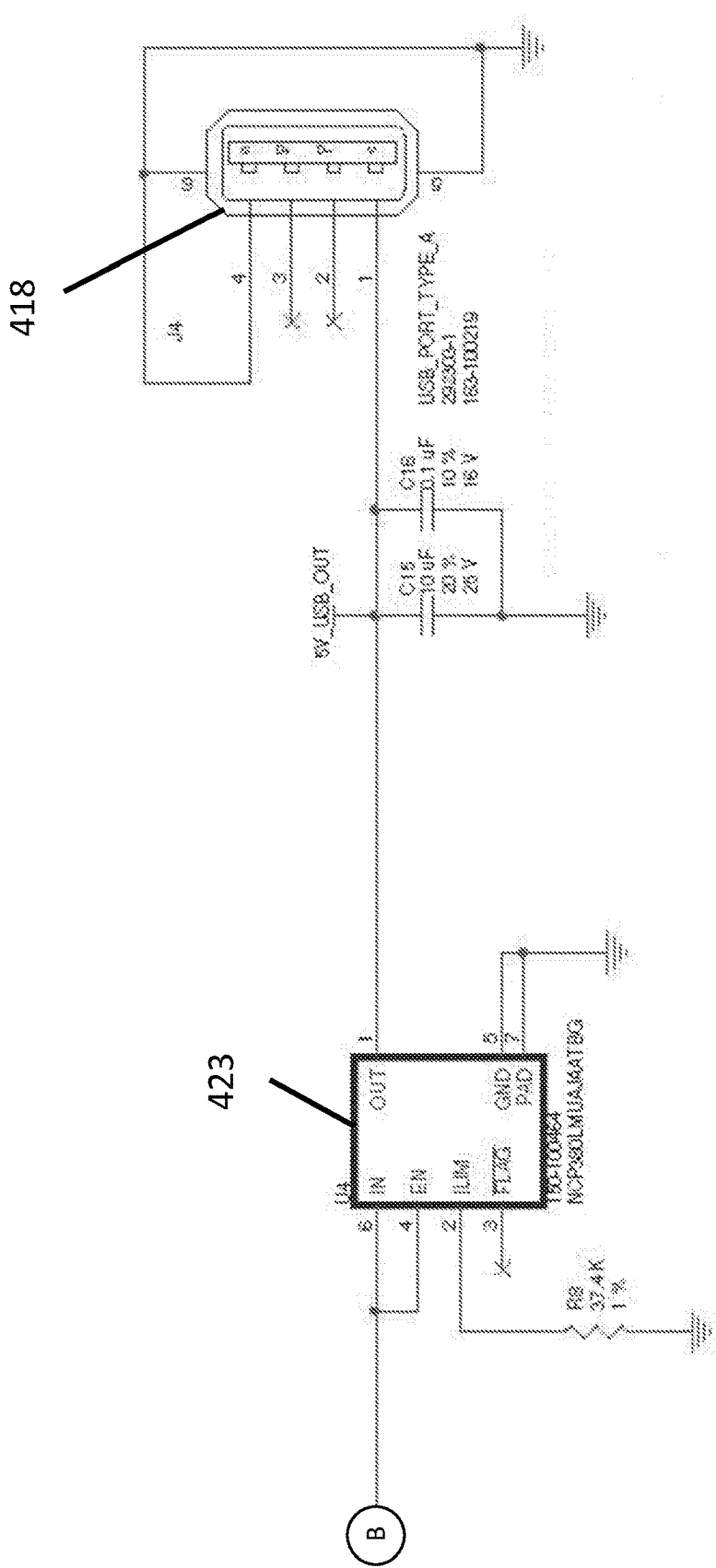
Figure 14A:
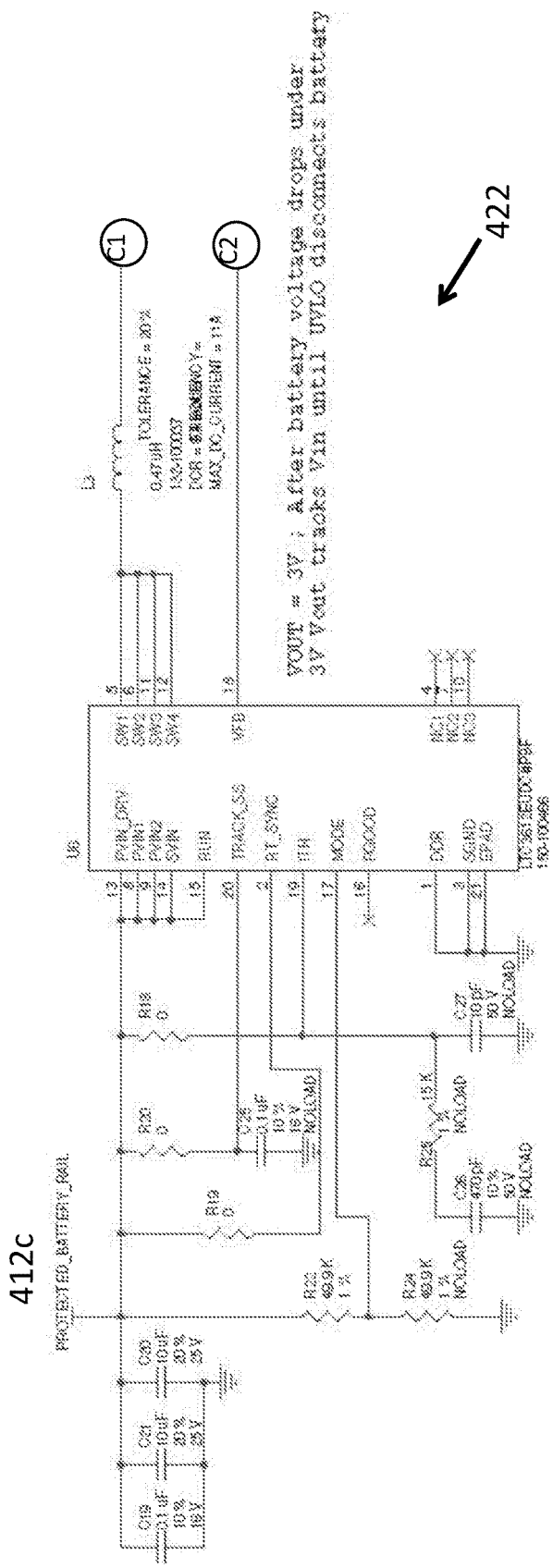
FIGS. 14A and 14B are a schematic diagram of an embodiment of the heater regulator circuit of FIG. 9.
Figure 14B:
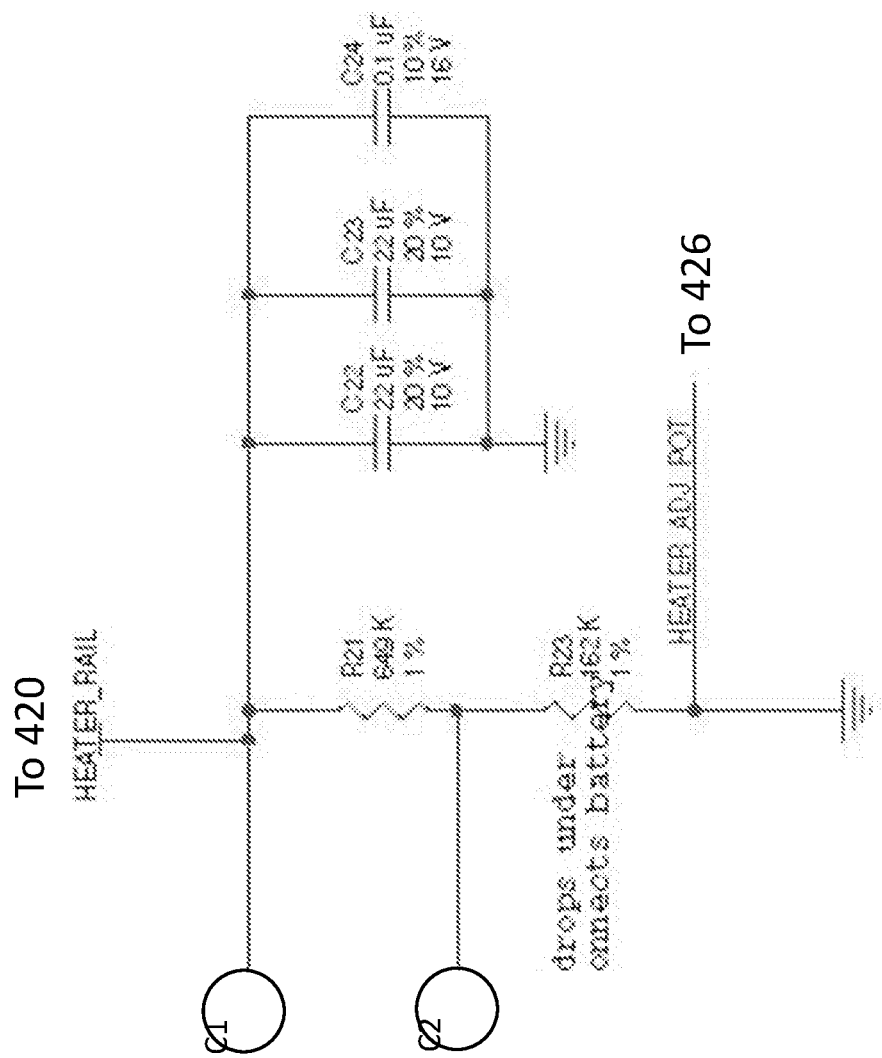
Figure 15:
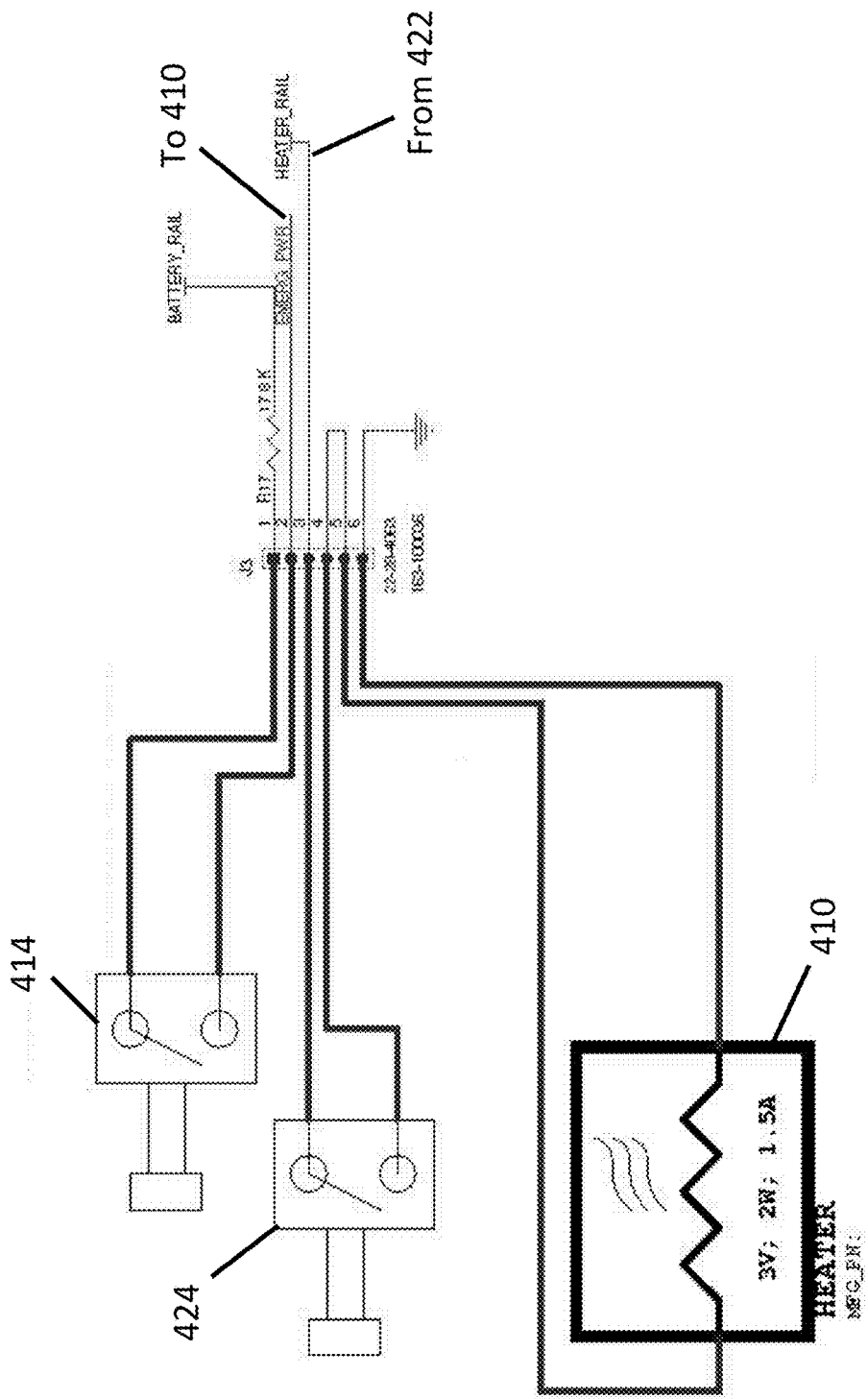
FIG. 15 is a schematic diagram of an embodiment of the heater circuit of FIG. 9.
Figure 16:
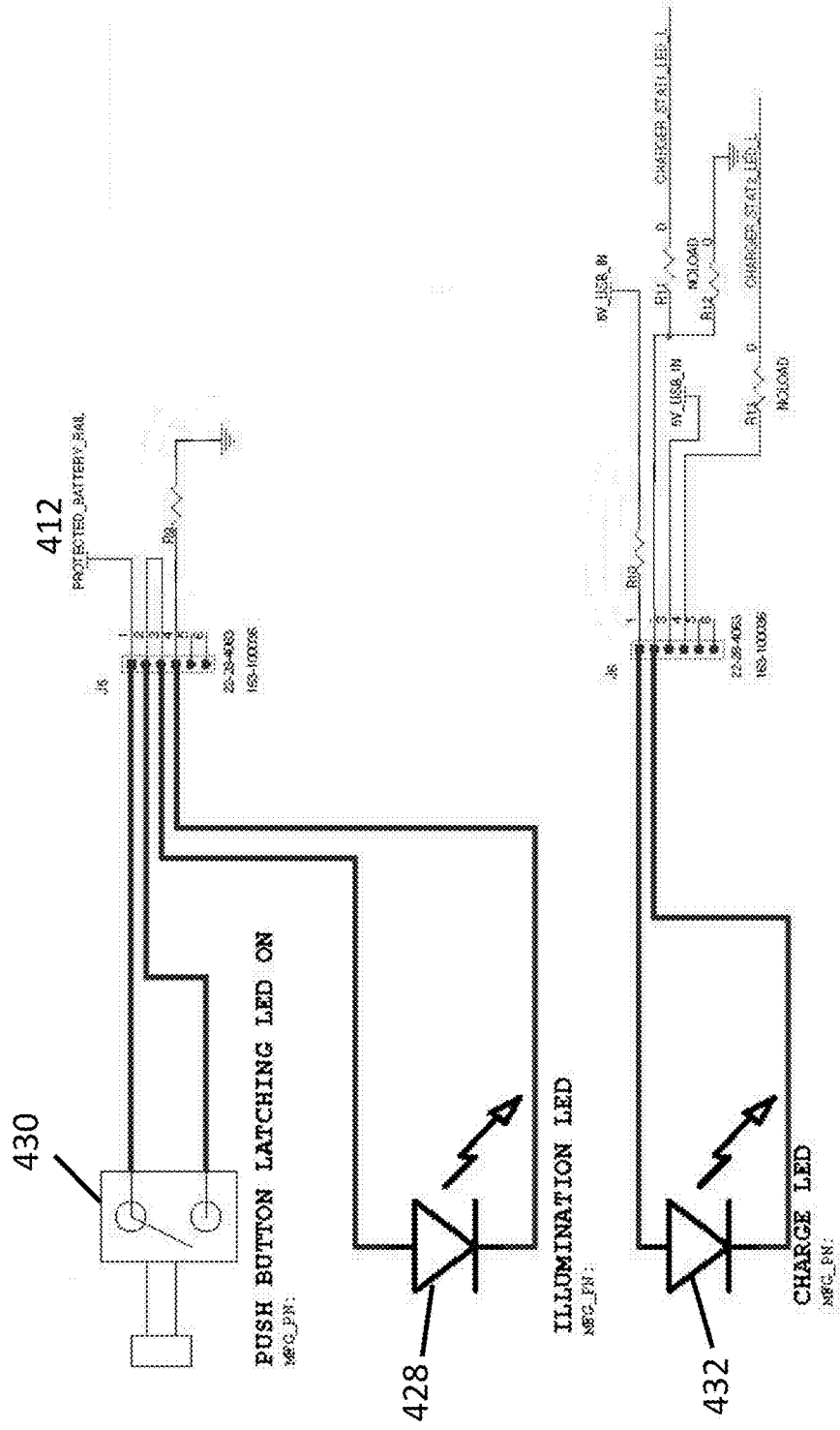
FIG. 16 is a schematic diagram of an embodiment of the lighting circuit of FIG. 9.

FIG. 9 is a more detailed block diagram of an embodiment of the electronics and power unit 400. In this embodiment, the solar array 102 may include two 4.5V (minimum) solar panels coupled in parallel that provide an average of 4.5 volts per panel in direct sunlight. A solar input boost module 404 coupled to the solar array 102 may provide a 5V input to a battery charger 406. The battery pack 402 may include one or more batteries, such as a 3.7V, 4500 mAh rechargeable lithium-ion battery, charged from the solar array 102 through the charger 406 during normal use of the helmet attachment 100 in the daytime. The battery pack 402 may also be charged by plugging an external 5 volt charger into the battery charger 406 through a power input connector 408. For example, the battery pack 402 may be charged at home using a common wall unit phone charger before an activity or may be charged in a vehicle using a car charger on the way to the activity. For near-universal convenience, the power input connector 408 may be a mini-USB connector or be any other power connector, such as a lightning connector used to charge for certain Apple products, or may be more than one type or size of connector to accommodate a variety of plugs.

The unit 400 may also include an under-voltage lockout (UVLO) circuit 410 configured to output a current to a protected battery rail (PBR) 412. The UVLO circuit 410 prevents the battery pack 402 from discharging completely by disconnecting the battery pack 402 from any loads in the event that the battery discharges below a threshold voltage. The battery pack 402 is thus protected from deep discharge, prolonging the cycle life of the battery pack 402. A switch 414 may be latched to permit the UVLO circuit 410 to be bypassed. The switch 414 may be used in an emergency event, for example, in which power is needed, but the battery pack 402 has become discharged below the threshold voltage and the risk to the battery pack 402 is outweighed by an immediate need for power.

A boost regulator 416 having an input coupled to the PBR 412 and an output coupled to a second USB connector 418 provides regulated 5V to any device that may be powered or charged from a conventional USB charger, such as a cell phone, an MP3 player, and some flashlights. As with the power input connector 408, the power output connector 418 may be any USB connector, such as mini-USB, lightning, or more than one type or size of connector. Preferably, the boost regulator 416 includes a current limit switch 423 to prevent excessive current from being drawn by the device being charged or powered through the USB connector 418.

A heater 420 may also be coupled to the PBR 412 through a heater regulator 422, such as a buck regulator. In one embodiment, the heater regulator 422 supplies a regulated 3 volts to the heater 420 as long as the PBR 412 voltage remains above 3V and supplies the PBR 412 voltage when the PBR 412 voltage drops below 3V. The heater 420 is turned on and off with a second switch 424 and an optional heater control 426 may be used to adjust the temperature of the heater 420. One embodiment of the heater 420 may be a 3 volt, 2 watt array of thermal-electric filaments secured on the top interior of the helmet 10 to provide direct warmth of, for example, 99° to the wearer's head, helping to reduce heat loss from the head. Such a heater may be beneficial, for example, in a ski helmet.

Another embodiment of the heater 420 may be the thermoelectric plate 104 secured in the air channel 308 between the shell 200 and the base 300. The plate 104 may be a 5 volt, 19.4 watt ceramic thermoelectric cooler Peltier chip, which transfers heat from a first side to the second side when an electric current is applied in a first direction. Such a heater may be beneficial, for example, in a motorcycle helmet. As previously described, air flowing through the channel 308 passes over the lower, warm side of the plate 104 and into the space below the base 300 to warm the helmet 10. When an electric current is applied in the opposite direction, the thermoelectric plate 104 transfers heat from the second side to the first side. Thus, the lower side of the thermoelectric plate 104 may be selectively used for heating or cooling.

One or more LED lights 428 may also be coupled to the PBR 412 and turned on and off with a third switch 430. The LED lights 428 are preferably mounted on the front of the shell 200 to serve as a headlamp and electrically coupled to the electronics package through an opening 214 in the front of the shell 200. The switches 414, 424, and 430 and the heater controller 426 may be mounted to the button holder 106 in the cavity 208 of the shell 200 where they may be easily reached by the user. In one variation of such a heater, a polarity reversal switch, such as a double-pole double-throw switch, may be used instead of the airflow controller 108, allowing the hot and cold sides of the plate 104 to be electrically reversed.

It will be appreciated that the electronics and power unit 400 may also include one or more status lights, such as a battery charge state indicator 432 or an indicator for any of the regulator circuits, or any other type of lights. The components of the electronics and power unit 400 are contained in a waterproof casing, either individually or as a complete package. In one embodiment, the solar input boost module 404, the UVLD module 410, the boost regulator 416, and the heater regulator 422 may be encapsulated into a waterproof package. The solar array 102, battery pack 402, heater 420, and LED 428 may be coupled to the rest of the electronics and power unit 400 using watertight plugs and connectors to allow easy replacement or disassembly. The electronics and power unit 400 is designed to avoid leakage of RF signals that could interfere with the operation of avalanches beacons and cell phones or other wireless devices.

Specific embodiments of the solar panel 102 and solar input boost circuit 404, battery charging circuit 406, UVLO circuit 410, boost regulator circuit 416, heater regulator circuit 422, heater circuit 426, and lighting circuit 428 are illustrated in the schematic diagrams of FIGS. 10-16, respectively. It will be appreciated that other circuit designs may be used.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A helmet attachment, comprising:
   a shell having a concave bottom;
   a base having:
      a convex top affixed to the concave bottom of the shell;
      a concave bottom affixable to the convex top of a helmet; and
      an air flow channel formed in the convex top of the base for guiding air entering from an entrance in a front of the base through to an exit in the concave bottom of the base;
   a power and electronics module secured within a cavity in the shell, comprising:
      a power source, comprising:
         a solar array secured to a top of the shell;
         a battery pack secured within the cavity in the shell; and
         a charging module secured within the cavity in the shell and configured to charge the battery pack from current provided by the solar array; and
         a 5 volt power output connector electrically coupled to the power source and configured for charging a small electronic device; and
      a heater electrically coupled to the power source, the heater comprising a thermoelectric plate whereby:
         heat is transferred from a first surface to a second surface, cooling the first surface, when electric current from the power source is applied in a first direction; and
         heat is transferred from the second surface to the first surface, cooling the second surface, when electric current from the power source is applied in a second direction opposite the first direction.

2. The helmet attachment of claim 1, wherein the power and electronics module further comprises a heater adjust control electrically coupled between the heater and the power source.

3. The helmet attachment of claim 1, further comprising an air flow controller having a first position in which air flowing through the air flow channel flows over the first surface of the thermoelectric plate and a second position in which air flowing through the air flow channel flows over the second surface of the thermoelectric plate.

4. The helmet attachment of claim 3, wherein the air flow controller comprises:
   a blade; and
   a tab connected to the blade wherein the blade is in the first position when the tab is pushed downwards and is in the second position when the tab is raised upwards.

5. The helmet attachment of claim 1, wherein the thermoelectric plate comprises a 5 volt ceramic thermoelectric cooler Peltier chip.

6. The helmet attachment of claim 1, wherein the power and electronics module further comprises a 5 volt power input connector electrically coupled to the charging module and configured to receive current from an external power source.

7. The helmet attachment of claim 1, further comprising an LED headlight secured to the front of the shell and electrically coupled to the power source.

8. The helmet attachment of claim 1, wherein the solar array comprises a first solar panel secured to the front of the top of the shell and a second solar panel secured to the rear of the top of the shell.

* * * * *